(12) United States Patent
Cruz-Hernandez et al.

(10) Patent No.: US 10,108,267 B2
(45) Date of Patent: Oct. 23, 2018

(54) SYSTEMS AND METHODS FOR SURFACE ELEMENTS THAT PROVIDE ELECTROSTATIC HAPTIC EFFECTS

(71) Applicant: Immersion Corporation, San Jose, CA (US)

(72) Inventors: Juan Manuel Cruz-Hernandez, Montreal (CA); Ali Modarres, Montreal (CA); Christopher Ullrich, Ventura, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/430,898

(22) Filed: Feb. 13, 2017

(65) Prior Publication Data

US 2017/0269690 A1    Sep. 21, 2017

Related U.S. Application Data

(63) Continuation of application No. 14/322,697, filed on Jul. 2, 2014, now Pat. No. 9,606,624.

(51) Int. Cl.
*G06F 3/01*    (2006.01)
*G06F 3/041*    (2006.01)
*G06F 1/16*    (2006.01)

(52) U.S. Cl.
CPC .......... *G06F 3/016* (2013.01); *G06F 3/0412* (2013.01); *G06F 1/163* (2013.01); *G06F 2203/013* (2013.01); *G06F 2203/014* (2013.01)

(58) Field of Classification Search
CPC .................. G06F 3/01; G06F 3/041
See application file for complete search history.

(56) References Cited

U.S. PATENT DOCUMENTS 6,337,678 B1   1/2002  Fish
6,819,312 B2   11/2004 Fish
(Continued)

FOREIGN PATENT DOCUMENTS

CN    105242772   1/2016
JP    2016015140  1/2016
(Continued)

OTHER PUBLICATIONS

U.S. Appl. No. 14/322,701, Office Action dated Mar. 21, 2016.
(Continued)

*Primary Examiner* — Shaheda Abdin
(74) *Attorney, Agent, or Firm* — Kilpatrick Townsend & Stockton LLP

(57) ABSTRACT

One illustrative system disclosed herein includes a processor configured to determine an electrostatic force (ESF)-based haptic effect and transmit a haptic signal associated with the ESF-based haptic effect. The illustrative system also includes an ESF controller in communication with the processor, the ESF controller configured to receive the haptic signal, determine an ESF signal based at least in part on the haptic signal, and transmit the ESF signal. The illustrative system further includes a surface configured to contact a user, and an ESF device coupled to the surface and in communication with the ESF controller, the ESF device configured to receive the ESF signal and output the ESF-based haptic effect on the surface.

20 Claims, 5 Drawing Sheets

(56) References Cited

U.S. PATENT DOCUMENTS

| | | | |
|---|---|---|---|
| RE42,064 E | 1/2011 | Fish | |
| 8,570,273 B1* | 10/2013 | Smith | G06F 3/0338 345/156 |
| 2010/0085169 A1 | 4/2010 | Poupyrev et al. | |
| 2010/0141407 A1 | 6/2010 | Heubel et al. | |
| 2010/0289740 A1 | 11/2010 | Kim et al. | |
| 2010/0328053 A1* | 12/2010 | Yeh | G06F 3/041 340/407.2 |
| 2011/0051360 A1 | 3/2011 | Dabov et al. | |
| 2011/0109588 A1 | 5/2011 | Makinen et al. | |
| 2011/0193824 A1 | 8/2011 | Modarres et al. | |
| 2011/0285666 A1* | 11/2011 | Poupyrev | G06F 3/045 345/174 |
| 2012/0229400 A1 | 9/2012 | Birnbaum et al. | |
| 2012/0268386 A1 | 10/2012 | Karamath et al. | |
| 2012/0268412 A1 | 10/2012 | Cruz-Hernandez et al. | |
| 2012/0287068 A1 | 11/2012 | Colgate et al. | |
| 2012/0327006 A1 | 12/2012 | Israr et al. | |
| 2013/0222280 A1 | 8/2013 | Sheynblat et al. | |
| 2013/0227410 A1 | 8/2013 | Sridhara et al. | |
| 2013/0314303 A1 | 11/2013 | Osterhout et al. | |
| 2015/0355710 A1 | 12/2015 | Modarres et al. | |
| 2016/0004308 A1 | 1/2016 | Cruz-Hernandez et al. | |

FOREIGN PATENT DOCUMENTS

| | | |
|---|---|---|
| KR | 10-1338 232 | 12/2013 |
| WO | 2010/037894 | 4/2010 |
| WO | 2013/007882 | 1/2013 |

OTHER PUBLICATIONS

U.S. Appl. No. 14/322,701, Office Action dated Sep. 21, 2015.
U.S. Appl. No. 14/322,701, Advisory Action dated Aug. 16, 2016.
U.S. Appl. No. 14/322,697, Final Office Action dated Apr. 20, 2016.
U.S. Appl. No. 14/322,697, Non-Final Office Action dated Sep. 24, 2015.
European Patent Office Application No. 15174405.9, European Search Report dated Oct. 6, 2015.
Yamamoto et al., A 2-DOF electrostatic sheet conveyer using wire mesh for desktop automation, Proceedings of the 2006 IEEE International Conference on Robotics and Automation, Orland, FL, May 2006, p. 2208-2213.
European Patent Office Application No. 15174405.9, Communication Pursuant to Article 94(3) EPC dated Dec. 13, 2017, 7 pages.

* cited by examiner

SYSTEMS AND METHODS FOR SURFACE ELEMENTS THAT PROVIDE ELECTROSTATIC HAPTIC EFFECTS

CROSS REFERENCE TO RELATED APPLICATIONS

This application is a continuation of and claims priority to U.S. patent application Ser. No. 14/322,697, filed on Jul. 2, 2014, and entitled "Systems and Methods for Surface Elements that Provide Electrostatic Haptic Effects," the entirety of which is hereby incorporated by reference herein.

FIELD OF THE INVENTION

The present invention relates to the field of user interface devices. More specifically, the present invention relates to surface elements that provide electrostatic haptic effects.

BACKGROUND

As computer-based systems become more prevalent, the quality of the interfaces through which humans interact with these systems is becoming increasingly important. One interface that is of growing popularity due to its intuitive and interactive nature is the touchscreen display. Through a touchscreen display, a user can perform a variety of tasks by contacting a region of the touchscreen with the user's finger. In order to create a more intuitive and enhanced user experience, designers often leverage user experience with physical interactions. This is generally done by reproducing some aspects of interactions with the physical world through visual, audio, and/or haptic feedback. Haptic feedback often takes the form of a mechanical vibration. There is a need for additional systems and methods to generate haptic feedback.

SUMMARY

Embodiments of the present disclosure comprise computing devices featuring surface elements that provide electrostatic force (ESF) haptic effects. In one embodiment, a system of the present disclosure may comprise a processor configured to determine an ESF-based haptic effect and transmit a haptic signal associated with the ESF-based haptic effect. The system may also comprise an ESF controller in communication with the processor, the ESF controller configured to receive the haptic signal, determine an ESF signal based at least in part on the haptic signal, and transmit the ESF signal. The system may further comprise a surface configured to contact a user, and an ESF device coupled to the surface and in communication with the ESF controller, the ESF device configured to receive the ESF signal and output the ESF-based haptic effect on the surface.

In another embodiment, a method of the present disclosure may comprise: determining an ESF-based haptic effect, transmitting a haptic signal associated with the ESF-based haptic effect to an ESF controller, determining an ESF signal based at least in part on the haptic signal, and transmitting the ESF signal associated with the ESF-based haptic effect to an ESF device configured to output the ESF-based haptic effect. The method may further comprise outputting the ESF-based haptic effect on a surface configured to contact a user. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
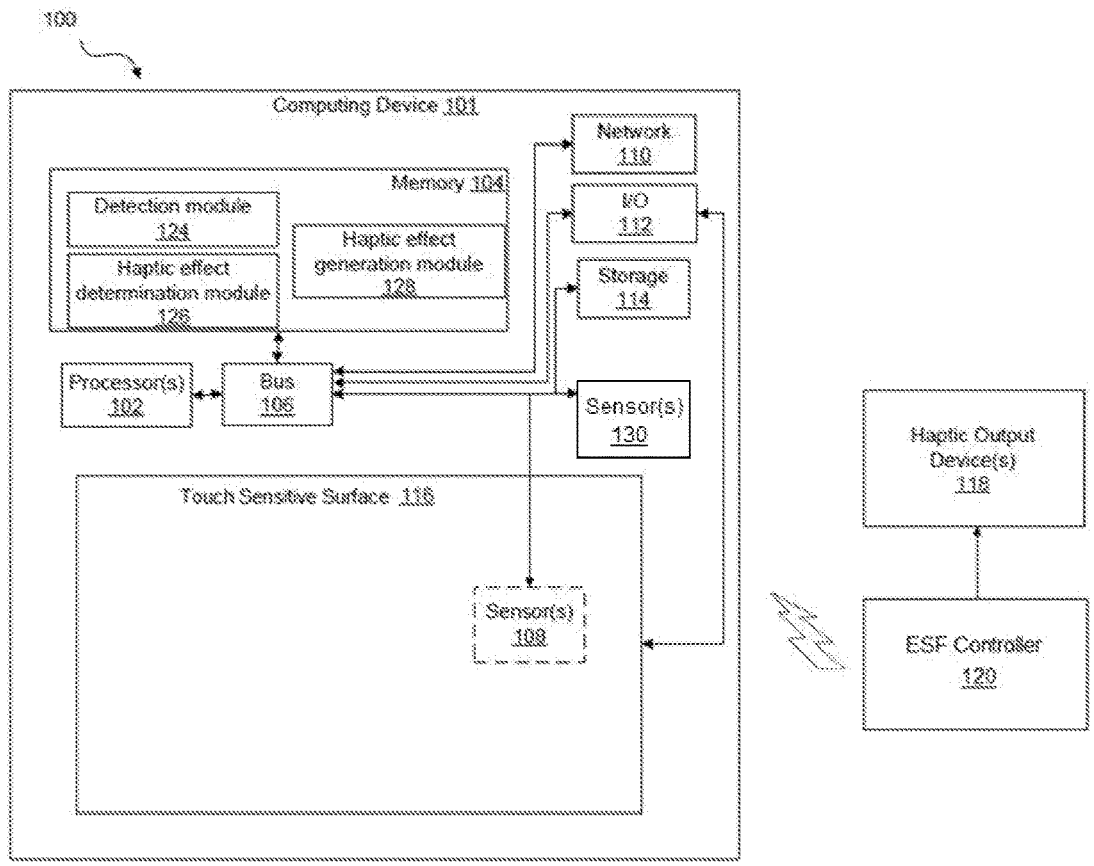
FIG. 1 is a block diagram showing a system for surface elements that provide electrostatic haptic effects according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of a Surface Element that Provides Electrostatic Haptic Effects One illustrative embodiment of the present disclosure comprises a gaming system, which is in communication with a surface element for providing electrostatic haptic effects to a user (hereinafter an "ESF device"). The gaming system includes a game console in communication with a user interface device, such as a game controller, smart phone, or tablet. Such gaming systems may include, for example, gaming systems commonly sold under the trademarks Microsoft Xbox®, Sony PlayStation®, Nintendo Wii®, or the Sega Zone®. The user interface devices may comprise and/or may be in communication with one or more user input elements. Such elements may include, for example, a button, joystick, camera, gyroscope, accelerometer, or touch-sensitive surface, any of which can be used to detect a user input alone or in combination with one another.

In the illustrative embodiment, the ESF device is configured to provide haptic feedback to a surface that a user contacts in order to control the gaming system. In the illustrative embodiment, the ESF device comprises an electrode coupled to an insulator, and is positioned so that the insulator contacts the user. For example, the ESF device may be coupled to a joystick, so that the insulator is positioned to directly contact the user's hand. The ESF device uses electrostatic attraction to output a haptic effect to the user operating the game controller. In such a system, the gaming system causes an electric signal, for example an AC signal, to be applied to the electrode. The electric signal generates a charge on the electrode, which may capacitively couple the electrode layer with an object (e.g., the user's head or hand, or a stylus) near or touching the surface of the ESF device. The capacitive coupling produces a haptic effect comprising, for example, a simulated vibration, a change in a perceived coefficient of friction, or a simulated texture to the user.

In the illustrative embodiment, the ESF device outputs a haptic effect in response to an event. For example, an event may comprise user input, a status notification, or a game event (e.g., when the user's virtual character is shot by another virtual character).

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Surface Elements that Provide Electrostatic Haptic Effects FIG. 1 is a block diagram showing a system 100 for surface elements that provide electrostatic haptic effects according to one embodiment. In the embodiment shown, system 100 comprises a computing device 101 having a processor 102 in communication with other hardware via bus 106. Computing device 101 may comprise, for example, a smartphone, tablet, or portable gaming device. While computing device 101 is shown as a single device in FIG. 1, in other embodiments, the computing device may comprise multiple devices, such as a game console and one or more game controllers.

A memory 104, which can comprise any suitable tangible (and non-transitory) computer-readable medium such as RAM, ROM, EEPROM, or the like, embodies program components that configure operation of the computing device 101. In the embodiment shown, computing device 101 further includes one or more network interface devices 110, input/output (I/O) interface components 112, and storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate wired or wireless connection to devices such as one or more displays, game controllers, keyboards, mice, joysticks, buttons, speakers, microphones, and/or other hardware used to input data or output data. Storage 114 represents nonvolatile storage such as magnetic, optical, or other storage media included in device 101 or coupled to processor 102.

System 100 further includes a touch sensitive surface 116, which, in this example, is integrated into computing device 101. Touch sensitive surface 116 represents any surface that is configured to sense tactile input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch sensitive surface 116 and used to determine the location of a touch and other information, such as pressure. As another example, optical sensors with a view of the touch sensitive surface 116 may be used to determine the touch position.

In other embodiments, the sensor 108 may comprise a LED detector. For example, in one embodiment, touch sensitive surface 116 may comprise a LED finger detector mounted on the side of a display. In some embodiments, the processor 102 is in communication with a single sensor 108, in other embodiments, the processor 102 is in communication with a plurality of sensors 108, for example, a first touch-screen and a second touch screen. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal.

In the embodiment shown, computing device 101 comprises one or more additional sensors 130. In some embodiments, the sensor 130 may comprise a gyroscope, an accelerometer, a global positioning (GPS) unit, a temperature sensor, an ambient light sensor, and/or other sensors for detecting motion, location, and/or environmental characteristics. In some embodiments, the processor 102 is in communication with a single sensor 130, in other embodiments, the processor 102 is in communication with a plurality of sensors 130, for example, a gyroscope and an accelerometer. The sensor 130 is configured to transmit sensor 130 signals to processor 102.

Touch sensitive surface 116 may or may not comprise (or otherwise correspond to) a display, depending on the particular configuration of the system 100. Some embodiments include a touch enabled display 116 that combines a touch sensitive surface 116 and a display of the device. The touch sensitive surface 116 may correspond to the display exterior or one or more layers of material above the actual display components. In other embodiments, a computing device 101 comprises a touch-sensitive surface 116 which may be mapped to a graphical user interface provided in a display that is included in system 100 interfaced to computing device 101.

The embodiment shown also includes an ESF controller 120, which is communicatively coupled to computing device 101 and configured to receive a haptic signal from processor 102, determine an ESF signal to be output to a haptic output device 118, and then transmit the ESF signal. ESF controller 120 may be communicatively coupled via wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

The ESF signal may comprise a signal configured to cause the haptic output device 118 to output a haptic effect associated with the haptic signal. In some embodiments, the ESF signal may comprise AC voltage from a power source. In some embodiments, the ESF controller 120 may comprise one or more operational amplifiers, transistors, and/or other digital or analog components for amplifying signals. For example, in one embodiment, ESF controller 120 may comprise a high-voltage amplifier. Further, in some embodiments, the ESF controller 120 may comprise a processor, a microcontroller, memory, a multiplexer, a transistor, a field programmable gate array (FPGA), a flip-flop, and/or other digital or analog circuitry. Although haptic output device 118 and ESF controller 120 are shown remote from computing device 101 in FIG. 1, in other embodiments, computing device 101 may comprise haptic output device 118 and ESF controller 120.

Haptic output device 118 is configured to output an effect that can be sensed by a user. In some embodiments, haptic output device 118 is configured to output a haptic effect comprising a simulated vibration, a change in a perceived coefficient of friction, a simulated texture, or a stroking sensation in response to an ESF signal. In one embodiment, haptic output device 118 uses electrostatic attraction, for example by use of an ESF device, to output a haptic effect to a user. Haptic output device 118 may be rigid or flexible.

Figure 2:
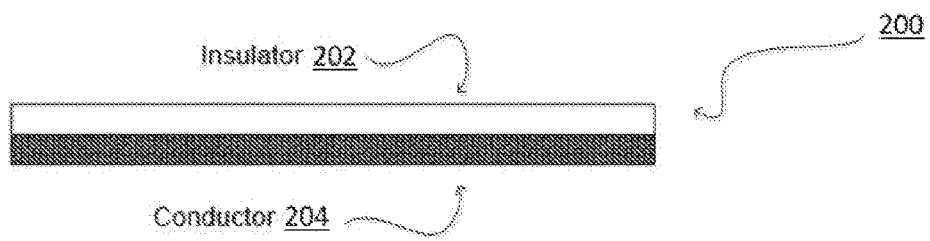
FIG. 2 shows an embodiment of a system for surface elements that provide electrostatic haptic effects.

In some embodiments, haptic output device 118 comprises an insulator coupled to a conductor 204, as shown in FIG. 2. The insulator 202 comprises an electrical insulator, for example, glass, porcelain, plastic, polymer, fiberglass, nitrogen, sulfur hexafluoride, or any other electrical insulator. In some embodiments, the insulator 202 may be flexible. In some embodiments, the insulator 202 may comprise a dielectric material or a transparent material. Further, in some embodiments, the insulator 202 is configured to directly contact the user's skin. In other embodiments, a material may be positioned between the insulator 202 and the user's skin to improve the contact between the haptic output device 200 and the user's skin. The conductor 204 comprises any semiconductor or other conductive material, for example, copper, tin, iron, aluminum, gold, silver, or carbon nanotubes.

The computing device operates the haptic output device 200 by applying an electric signal to the conductor 204, which may induce an electric charge on the conductor 204. The electric signal is an AC signal that, in some embodiments, may be generated by a high-voltage amplifier. In some embodiments, the charge on the conductor 204 may capacitively couple the conductor 204 with an object near or touching the haptic output device 200, for example, a user's arm. The capacitive coupling may, in some embodiments, output a haptic effect comprising a simulated vibration, a change in a perceived coefficient of friction, or a simulated texture to the user. For example, in one embodiment, the capacitive coupling produces an attractive force between parts of the body or an object near the surface of the haptic output device 200. In such an embodiment, the attractive force stimulates the nerve endings in the skin of a user's body, for example, his or her forearm. The nerve endings in the skin, for example, are stimulated and sense the electrostatic force (e.g., the capacitive coupling) as a vibration or some more specific sensation. In some embodiments, varying the level of attraction between the object and the conductor 204 can vary the sensation, e.g., the vibration felt by the user.

For example, in some embodiments, the computing device's processor may output a haptic signal to an ESF controller. Based on this haptic signal, the ESF controller outputs an ESF signal to the haptic output device 200. The haptic output device 200 receives the ESF signal at the conductor 204. As the ESF signal travels through the conductor 204, the ESF signal may charge the conductor 204 so that it capacitively couples the conductor 204 with an object near or touching the surface of haptic output device 200. This capacitive coupling provides the haptic effect.

Figure 3A:
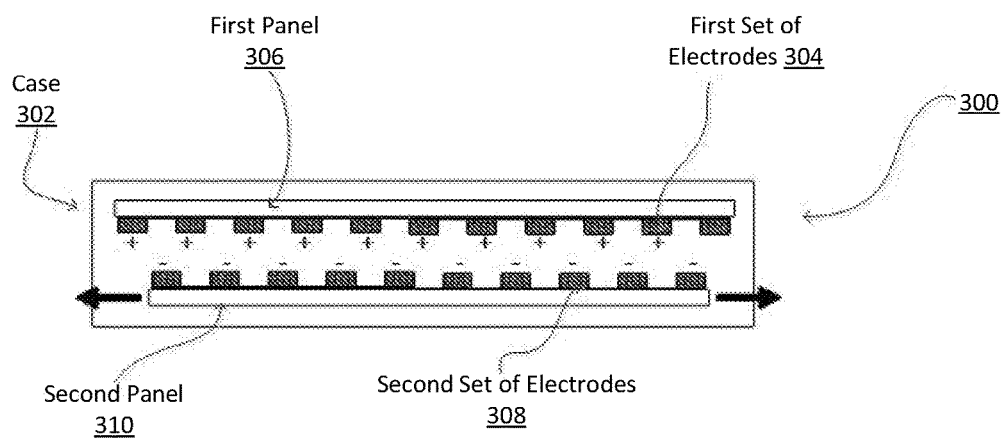
FIG. 3A shows a system for surface elements that provide electrostatic haptic effects according to another embodiment.

Another embodiment of haptic output device 118 is shown in FIG. 3A. In some such embodiments, haptic output device 300 comprises a case 302. The case 302 comprises a first set of electrodes 304 coupled to a first panel 306. The first panel 306 is fixed in place. The case 302 also comprises a second set of electrodes 308 coupled to a second panel 310. The second panel 310 is configured to move. The computing device operates the haptic output device 300 by charging the first set of electrodes 304 with a polarity (e.g., positive) and the second set of electrodes 308 with an opposite polarity (e.g., negative). In such embodiments, the first set of electrodes 304 will attract the second set of electrodes 308, causing the second panel 310 to slide horizontally, as shown by the horizontal arrows in the figure.

In some embodiments, the case 302 is positioned directly against the user's skin, such that the user may perceive the sliding of the second panel 310. In some such embodiments, the user may perceive the sliding of the second panel 310 as a stroking sensation, which may mimic the sensation of the user's skin being caressed by, for example, another person's hand or other object.

For example, in some embodiments, the computing device's processor outputs a haptic signal to an ESF controller. Based on this haptic signal, ESF controller determines an ESF signal and outputs the ESF signal to haptic output device 300. The haptic output device 300 receives the ESF signal at the first set of electrodes 304, charging the first set of electrodes 304 with a polarity (e.g., positive). Further, the haptic output device 300 receives a different (e.g., inverted) ESF signal at the second set of electrodes 308, such that electrodes 308 are charged with an opposite polarity (e.g., negative). The first set of electrodes 304 will attract the second set of electrodes 308, causing the second panel 310 to slide. A user may perceive the sliding of the second panel 310 as a haptic effect.

Figure 3B:
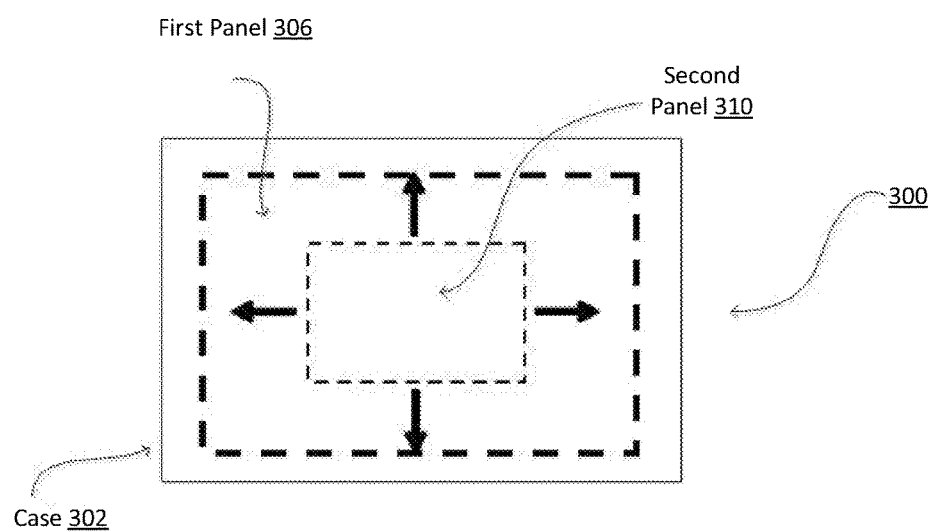
FIG. 3B shows an external view of another embodiment of the system shown in FIG. 3A.

In some embodiments, as shown in FIG. 3B, the haptic output device 300 may be configured to slide the second panel 310 in two dimensions, for example, horizontally and vertically. In such an embodiment, if the haptic output device is contacting a user, the user may perceive the movement of the moving panel 310 as a haptic effect comprising a stroking sensation in two dimensions. In some embodiments, the charges on the first set of electrodes 304 or the second set of electrodes 308 can be varied to create vibrations, stroking sensations in multiple directions, or other haptic effects. In one such embodiment, the stroke speed is altered by varying the charge (e.g., varying the voltage) on the first 304 or second 308 set of electrodes. In some embodiments, the computing device outputs different haptic effects by altering the stroke speed of the haptic output device 300. For example, in one such embodiment, the computing device outputs a haptic effect comprising a slow stroking sensation to simulate virtual running water in a video game. In another embodiment, the computing device outputs a haptic effect comprising a fast stroking sensation to simulate virtual character's brush against a virtual wall in a video game.

Referring back to FIG. 1, in some embodiments, haptic output device 118 may comprise an ESF device of the type described above, in addition to other kinds of haptic output devices. For example, haptic output device 118 may also comprise one or more of, for example, a piezoelectric actuator, an electric motor, an electro-magnetic actuator, a voice coil, a shape memory alloy, an electro-active polymer, a solenoid, an ERM, or a linear resonant actuator (LRA). Further, some haptic effects may utilize an actuator coupled to a housing of the computing device 101, and some haptic effects may use multiple actuators of the same or different types in sequence and/or in concert. Although a single haptic output device 118 is shown here, embodiments may use multiple haptic output devices 118 of the same or different type to produce haptic effects. For example, in some embodiments, haptic output device 118 comprises actuators configured to output a vibratory haptic effect and an ESF device configured to output a stroking sensation to the user.

Turning to memory 104, illustrative program components 124, 126, and 128 are depicted to illustrate how a device can be configured in some embodiments to provide electrostatic haptic effects via surface elements. In this example, a detection module 124 configures processor 102 to monitor touch sensitive surface 116 via sensor 108 to determine a position of a touch. For example, module 124 may sample sensor 108 in order to track the presence or absence of a touch and, if a touch is present, to track one or more of the location, path, velocity, acceleration, pressure and/or other characteristics of the touch over time.

Haptic effect determination module 126 represents a program component that analyzes data to select a haptic effect to generate. Particularly, module 126 may comprise code that determines a haptic effect to output to the user and code that selects one or more haptic effects to provide, and/or one or more haptic output devices 118 to actuate, in order to simulate the effect. In embodiments, the haptic effect may comprise an electrostatic haptic effect. For example, in some embodiments, some or all of the area of touch sensitive surface 116 may be mapped to a graphical user interface. Different haptic effects may be selected based on the location of a touch in order to output haptic feedback, such as a simulated vibration, to a user so that the feature is felt when a corresponding representation of the feature is seen in the interface. However, haptic effects may be provided via haptic output device 118 even if a corresponding element is not displayed in the interface (e.g., a haptic effect may be provided if a boundary in the interface is crossed, even if the boundary is not displayed). In some embodiments, haptic effect determination module 126 may determine haptic effects based on other kinds of events, for example, other kinds of user input (e.g., a button press, joystick manipulation, and/or tilting or moving the computing device 101), game activity (e.g., a gunshot, an explosion, jumping, falling, or completing a level or mission), background system 100 activity, and/or system 100 status notifications (e.g., low battery, low memory, a network connection problem, or a problem with hardware or software).

Haptic effect generation module 128 represents programming that causes processor 102 to generate and transmit a haptic signal to ESF controller 120 to generate the selected electrostatic haptic effect. For example, generation module 128 may access stored waveforms or commands to send to ESF controller 120. As another example, haptic effect generation module 128 may receive a desired type of haptic effect and utilize signal processing algorithms to generate an appropriate signal to send to ESF controller 120. Some embodiments may utilize multiple haptic output devices 118 in concert to simulate a haptic effect. For instance, in one such embodiment, haptic output device 118 outputs a simulated vibration upon a user crossing a boundary between buttons on an interface, and outputs a stroking sensation when the button is pressed.

Figure 4:
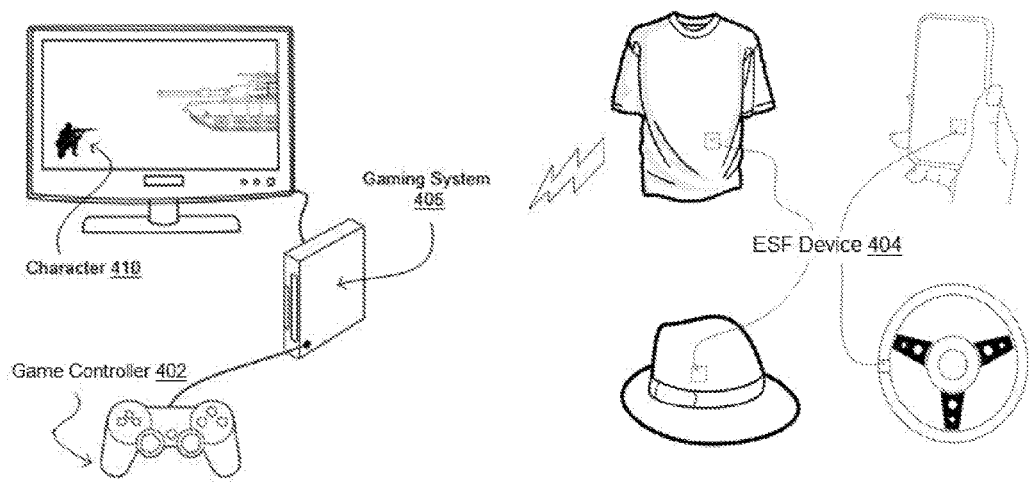
FIG. 4 shows an external view of a system for surface elements that provide electrostatic haptic effects according to another embodiment.

FIG. 4 shows a system for surface elements that provide electrostatic haptic effects according to another embodiment. In this example, a user is playing a military video game on gaming system 406, wherein the user controls a virtual character 410. The user may interact with the gaming system via game controller 402. The system further includes one or more ESF devices 404 positioned on a wearable or manipulable device for providing haptic feedback.

In one embodiment, as the user moves the virtual character 410 around the virtual environment, one or more events may occur. For example, in one such embodiment, an event may comprise the character 410 getting shot. In such an embodiment, based on the event, the gaming system 406 may determine a haptic effect to output, for example a simulated vibration, a change in a perceived coefficient of friction, a texture, a perceived change in temperature, or stroking sensation, and actuate the ESF device 404 to output the haptic effect.

In some embodiments, the ESF device 404 may be associated with wearable devices, such as hats, sleeves, jackets, collars, glasses, gloves, rings, articles of clothing, wristbands, headbands, and/or jewelry. In one embodiment shown in FIG. 4, the ESF device 404 is positioned near a user's stomach on the surface of a shirt. As the user plays the video game on gaming system 406, in response to an event, gaming system 406 may output a haptic effect, such as a simulated vibration or stroking sensation, to the user. In such an embodiment, the user may perceive a vibration on or near his or her stomach. In another embodiment shown in FIG. 4, ESF device 404 is positioned on the surface of a hat worn by the user. As the user plays the video game on gaming system 406, in response to an event, gaming system 406 may output a haptic effect, such as a simulated vibration or stroking sensation, to the user. In such an embodiment, the user may perceive a vibration or stroking sensation on or near his or her head. Further, in some embodiments, the wearable devices may be associated with a part of a user's body, for example, a user's finger, arm, hand, foot, leg, shoulder, head, or other body part. In some embodiments, the ESF device 404 may be configured to attach to a part of the user's body. For example, the ESF device 404 may comprise an adhesive for adhering to a user's body part or may be configured to wrap around a user's body part. For instance, in some embodiments, the ESF device 404 may be positioned on a part of the user's body, for example, the user's shoulder. As the user plays the video game on gaming system 406, in response to an event, gaming system 406 may output a haptic effect, such as a simulated vibration or stroking sensation, to the user. In some embodiments, the user may perceive a vibration on or near his or her shoulder.

In other embodiments, the ESF device 404 may be associated with a manipulable device. A manipulable device is a device configured to be manipulated by a user and may include devices that can be held or grasped. For example, in some embodiments, a manipulable device may comprise a game system controller, a steering wheel, a mobile device, a mobile device holder, a tablet, an e-reader, a laptop, a gamepad, a joystick, a button, a stylus, a remote control, a mouse, a keyboard, or a gear shifter. Such devices may be, for example, standalone devices or may be controls incorporated into mobile devices, automotive dashboards, or other control surfaces. In some embodiments, a manipulable device may contact portions of a user's hand, for example, the user's fingertips, palm, fingers, or the back of the user's hand. In one embodiment, an ESF device 404 may be positioned on the game controller 402, for example, on a joystick, a trigger, a button, or on the surface of the game controller 402. In one embodiment shown in FIG. 4, an ESF device 404 may be positioned on a steering wheel, either for playing a video game, as in this example, or in a car. As the user plays the video game on the gaming system 406, in response to an event, the gaming system 406 may output a haptic effect, such as a simulated vibration, a change in a perceived coefficient of friction, a simulated texture, or a stroking sensation. In one such embodiment, the user may perceive the haptic effect at his or her fingertips or in his or her palm as he or she grasps or manipulates the game controller 402 or steering wheel.

In another embodiment shown in FIG. 4, an ESF device 404 is positioned on the surface of a mobile phone. In such an embodiment, the mobile phone may be in communication with the game system 406 and used instead of or in addition to the game controller 402 for playing a video game. As the user plays the video game on gaming system 406, in response to an event, gaming system 406 may output a haptic effect via ESF device 404 to the user. In one such embodiment, the user may perceive the haptic effect at his or her fingertips or in his or her palm as he or she grasps the mobile device.

Although the computing device shown in FIG. 4 comprises a gaming system 406, in other embodiments, the computing device may comprise, for example, a laptop computer, desktop computer, a tablet, an e-reader, a gamepad, a computer for controlling a car, a mobile phone (further discussed with respect to FIG. 5), and/or other computing device. In some such embodiments, the computing device communicates with ESF device 404 and, in response to an event, may output a haptic effect to the user.

In some embodiments, the computing device may comprise a laptop computer, desktop computer, tablet, or e-reader. In some such embodiments, the ESF device 404 may be associated with a wearable or manipulable device. For example, in some embodiments, the ESF device 404 may be positioned on the surface of the laptop computer, desktop computer, tablet, e-reader, or a computer mouse. In some embodiments, the user may be, for example, playing a video game on the computing device or performing other computing tasks (e.g., checking e-mail, browsing the internet, or drafting a document). As the user plays the video game, interacts with the computing device, or performs other computing tasks on the computing device (e.g., watches video or listens to audio), the computing device may output a haptic effect via ESF device 404. In some embodiments, the haptic effect may comprise a simulated vibration, a simulated texture, or a change in a perceived coefficient of friction.

Further, in some embodiments, events may be output even though the computing device does not detect an interaction by a user. For example, in some embodiments, the computing device may output a haptic effect via ESF device 404 upon the occurrence of a background event or to indicate the system's status, for example, to indicate a low battery, low memory, an incoming phone call, a network connection error, an incoming text message, and/or any other background event or system status.

Any number or configuration of ESF devices 404 may be used to output haptic effects to a user. In some embodiments, multiple ESF devices 404 may output haptic effects in sequence or in concert to output a haptic effect to a user. For example, in some embodiments, upon the occurrence of an event, an ESF device 404 configured to contact the user's finger may output a haptic effect in sequence or in concert with an ESF device 404 configured to contact the user's palm. In some embodiments, the user may perceive the haptic effects as a composite haptic effect.

Figure 5:
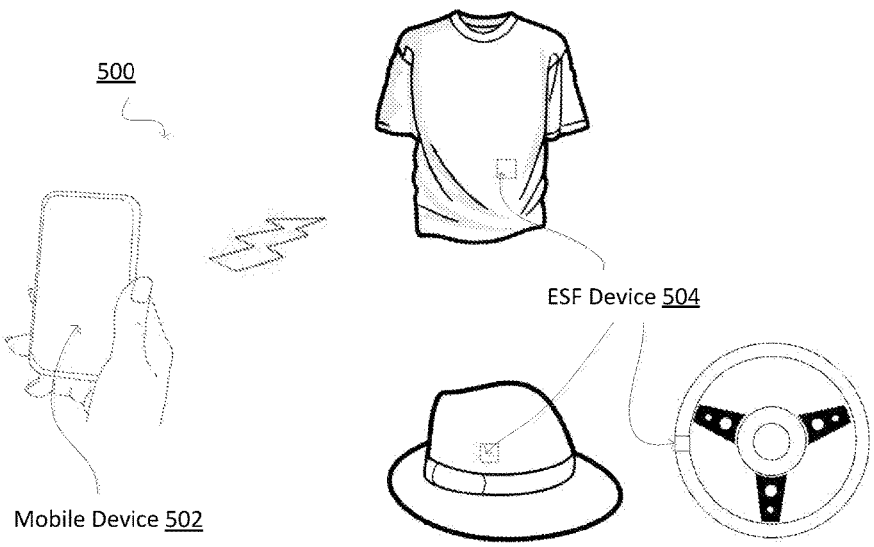
FIG. 5 shows another embodiment of an external view of a system for surface elements that provide electrostatic haptic effects.

FIG. 5 shows a system 500 for surface elements that provide electrostatic haptic effects according to another embodiment. System 500 comprises a computing device which, in this example, comprises a mobile device 502. The mobile device 502 is in communication with ESF device 504, which may be associated with a wearable or manipulable device. For example, in some embodiments, ESF device 504 may be associated with hats, sleeves, jackets, collars, glasses, gloves, rings, wristbands, headbands, articles of clothing, jewelry, game system controllers, steering wheels, other mobile devices, mobile device holders, tablets, e-readers, laptops, gamepads, joysticks, and/or gear shifters.

In some embodiments, a user may interact with the mobile device 502. In some such embodiments, the user may interact with the mobile device 502 by pressing real or virtual buttons, tilting the mobile device 502, or interacting with a touch sensitive display. As the user interacts with the mobile device 502, one or more events may occur. For example, in one such embodiment, a user may be playing a virtual puzzle game. If the user correctly fits a piece into the puzzle, the system 500 may provide haptic feedback. In such an embodiment, based on this event, the mobile device 502 may determine a haptic effect to output, for example a simulated vibration, a change in a perceived coefficient of friction, a texture, a perceived change in temperature, or stroking sensation, and actuate the ESF device 504 to output the haptic effect.

In some embodiments, the mobile device 502 may output haptic effects even though the mobile device 502 does not detect an interaction by a user. For example, in some embodiments, the mobile device 502 may output a haptic effect via ESF device 504 upon the occurrence of a background event or to indicate the system's status, for example, to indicate a low battery, low memory, an incoming phone call, a network connection error, an incoming text message, and/or any other background event or system status. As another example, mobile device 502 may output haptic effects upon the mobile device 502 displaying video content or outputting audio content.

In one embodiment shown in FIG. 5, ESF device 504 is positioned near a user's stomach on the surface of a shirt. As the user plays the video game on mobile device 502 or otherwise interacts with the device, in response to an event, mobile device 502 may output a haptic effect, such as a simulated vibration or a stroking sensation, to the user. In such an embodiment, the user may perceive a vibration on or near his or her stomach. In another embodiment shown in FIG. 5, ESF device 504 is positioned on the surface of a hat worn by the user. As the user plays the video game on mobile device 502 or otherwise interacts with the device, in response to an event, mobile device 502 may output a haptic effect, such as a simulated vibration or stroking sensation, to the user. In such an embodiment, the user may perceive a vibration or stroking sensation on or near his or her head. In yet another embodiment shown in FIG. 5, ESF device 504 is positioned on the surface of a steering wheel. As the user plays the video game or otherwise interacts with the device, in response to an event, mobile device 502 may output a haptic effect, such as a simulated vibration or a stroking sensation, to the user. In such an embodiment, the user may perceive a vibration or stroking sensation on or near his or her hands as he or she grasps the steering wheel.

A computing device (e.g., mobile device 502) may actuate any number or configuration of ESF devices 504 to output a haptic effect to a user. In some embodiments, a computing device may actuate multiple ESF devices 504 in sequence or in concert to output a haptic effect to a user. For example, in some embodiments, upon the occurrence of an event, an ESF device 504 configured to contact the user's arm may output a haptic effect in sequence or in concert with an ESF device 504 configured to contact the user's shoulder. In some embodiments, the user may perceive the haptic effects as a composite haptic effect.

Figure 6:
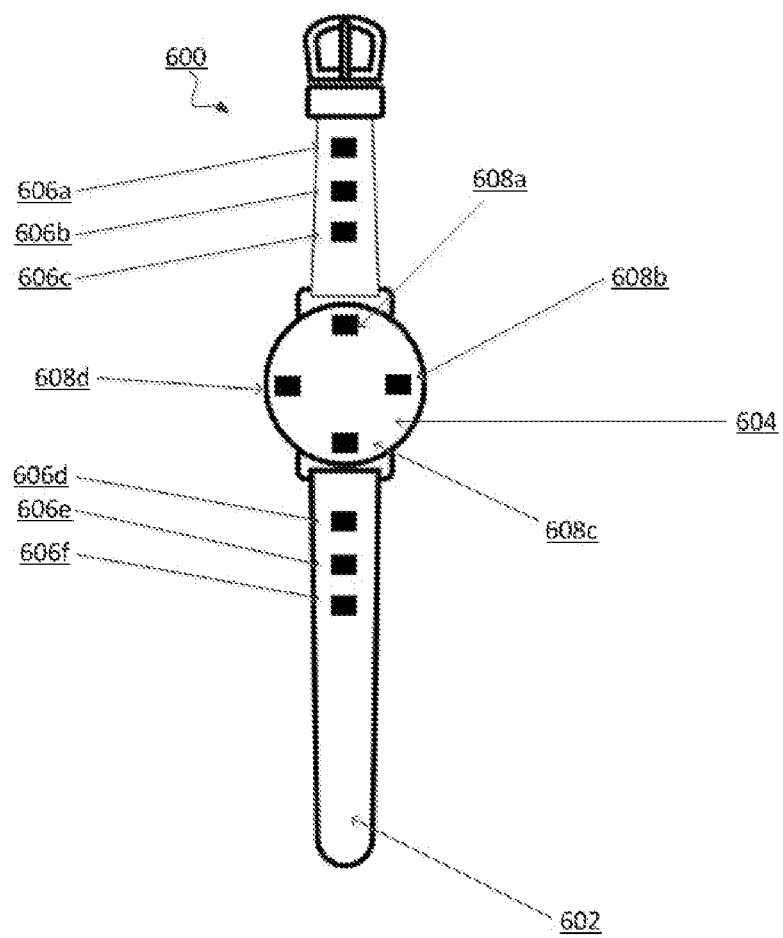
FIG. 6 shows another embodiment of an external view of a system for surface elements that provide electrostatic haptic effects.

FIG. 6 shows another embodiment of an external view of a system 600 for surface elements that provide electrostatic haptic effects. In the example shown in FIG. 6, the system 600 comprises a wristwatch, including a watchband 602. The watchband 602 may be wrapped around a user's wrist. Further, multiple ESF devices 606a-f may be positioned around the watchband 602 or multiple ESF devices 608a-d may be positioned on the front, sides, or back of the watch 604. While the example shown in FIG. 6 comprises ESF device 606a-f and 608a-d positioned on a wristwatch and around a watchband, in other embodiments, ESF devices 606a-f and 608a-d may be positioned in any suitable arrangement on any number of devices, including on a mobile device, a mobile device holder, a sleeve, an article of clothing, a hat, a jacket, gloves, a ring, jewelry, a collar, glasses, a tablet, an e-reader, a laptop, a gamepad, a mouse, a keyboard, a stylus, a remote control, a game system controller, a steering wheel, a joystick, a button, a seat, and/or a gear shifter.

In some embodiments, system 600 actuates the ESF devices 606a-f and/or 608a-d in series or in concert to provide a haptic effect. In some embodiments, system 600 may comprise, for example, a mobile device, a laptop computer, a desktop computer, a tablet, an e-reader, a car computer system, a watch, and/or other computing device that, in response to an event, actuates ESF devices 606a-f and/or 608a-d to output a haptic effect. In some such embodiments, the computing device is in communication with ESF devices 606a-f and/or 608a-d via wired interfaces such as Ethernet, USB, IEEE 1394, and/or wireless interfaces such as IEEE 802.11, Bluetooth, infrared, satellite, PAN, WAN or radio interfaces for accessing cellular or other networks.

For example, in one embodiment, system 600 comprises a computing device for controlling a car. The computing device is in communication (e.g., via a wireless connection of the types discussed above) with the haptically-enabled wristwatch, which may be worn by the driver, shown in FIG. 6. The car may have blind spot detection enabled, wherein the computing device may detect a car in a driver's blind spot and actuate ESF devices 606a-f and/or 608a-d to produce haptic feedback. In one such embodiment, upon detecting a car in the driver's blind spot, the computing device may actuate ESF devices 606a-f in sequence around the driver's wrist, for example to provide a series of simulated vibrations in a clockwise or counterclockwise formation, in order to alert the driver to the detected car. In another embodiment, the computing device is in communication with ESF devices 606a-f and/or 608a-d, which may be positioned around the surface of the car's steering wheel or gear shifter. In response to an event, such as changing the car's stereo station, an adjustment to cruise control, a vehicle alarm, a blind spot detection, or some other event, the computing device may actuate ESF devices 606a-f and/or 608a-d to provide haptic feedback to a user.

In other embodiments, the ESF devices 608a-d may be arranged so there are four cardinal points in contact with the user, which can be activated sequentially or in concert to output haptic effects. In such an embodiment, ESF devices 608a-d may be positioned on the back of the watch 604. In one such embodiment, as the system 600 determines that the time is 12:00, 3:00, 6:00, or 9:00, the system 600 may actuate the respective ESF device 608a-d, which may output a haptic effect. For example, in one embodiment, ESF device 608a may output an effect when the system 600 determines it is 12:00, ESF device 608b may output an effect when the system 600 determines it is 3:00, ESF device 608c may output an effect when the system 600 determines it is 6:00, and ESF device 608d may output an effect when the system 600 determines it is 9:00. In some such embodiments, the haptic effect may comprise a simulated vibration. In another embodiment, ESF devices 608a-d may output an effect simulating a radial stroke by sequentially activating ESF devices 608a-d. Further, in some embodiments, ESF devices 608a-d may output an effect simulating a patterned vibration by activating and deactivating ESF devices 608a-d in a predefined or user-defined pattern.

In embodiments, the system 600 may comprise stripes of ESF devices 606a-f, which can be activated sequentially or in concert to output haptic effects. For example, in one such embodiment, each stripe may comprise multiple ESF devices 606a-f and be positioned in a different location or orientation around the watchband 602. In one embodiment, system 600 may output a haptic effect by actuating one or more stripes of ESF devices 606a-f in series or in concert. In some embodiments, system 600 may actuate the stripes of ESF devices 606a-f sequentially around the user's wrist to confirm receipt of a user input, such as a button press.

In some embodiments, ESF devices 608a-d may be actuated in sequence or in concert to output textures. In such an embodiment, the system 600 may output a haptic effect configured to simulate a texture upon the occurrence of an event. For example, in one embodiment, ESF devices 608a-d are positioned on the surface of a wristwatch. Upon the system 600 determining a certain time, the system 600 may actuate ESF devices 608a-d in a pattern configured to simulate a texture. In some embodiments, the texture may comprise a smooth, bumpy, rubbery, or other sensation. For example, in one embodiment, at 12:00 the system 600 may actuate ESF devices 608a-d such that they simulate vibrations in a formation configured to cause a user wearing the wristwatch to perceive a haptic effect comprising a bumpy texture.

In some embodiments, system 600 may actuate ESF devices 606a-f in sequence or in concert to provide alerts. For example, in embodiments, system 600 may actuate ESF devices 606a-f to alert the user to dangerous driving conditions, upcoming navigational events, or car states, for example, a low car battery or that the user has activated a blinker signal. In one such embodiment, ESF devices 606a-f may be positioned on the steering wheel and output a haptic effect, such as a series of simulated vibrations counterclockwise around the steering wheel, if the left blinker is activated. Likewise, other ESF devices 606a-f may be positioned on the steering wheel and output a haptic effect, such as a series of simulated vibrations clockwise around the steering wheel, if the right blinker is activated.

One of ordinary skill in the art will recognize that a multitude of other ESF device 606a-f and 608a-d configurations, haptic effects, and events triggering haptic effects are possible. For example, in some embodiments, system 600 may output haptic effects to confirm receipt of user input, to provide an alert or notification, to simulate a physical interaction with a graphical user interface object, or for any number of other reasons.

Figure 7:
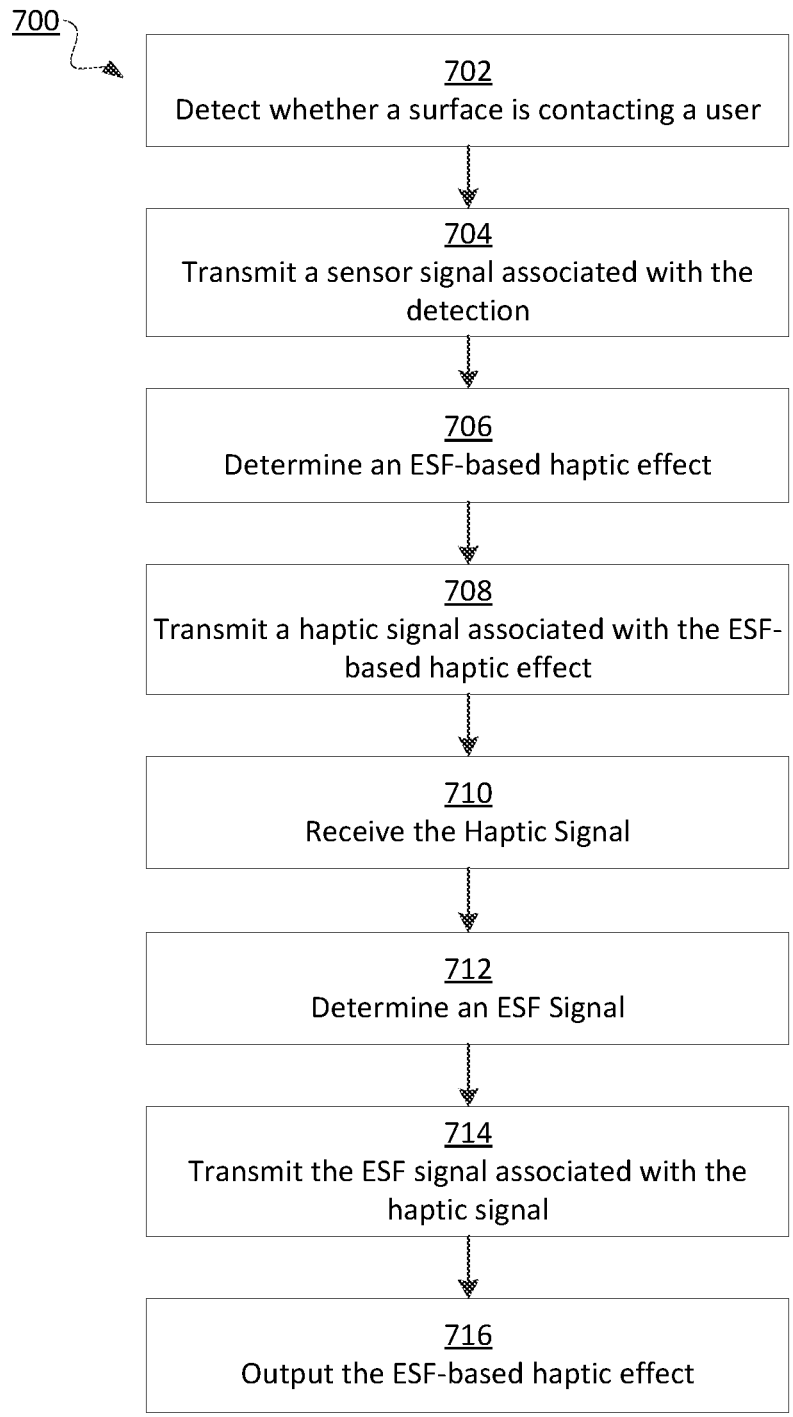
FIG. 7 is a flow chart of steps for performing a method for providing surface elements that provide electrostatic haptic effects according to one embodiment.

Illustrative Methods for a Surface Element that Provides Electrostatic Haptic Effects FIG. 7 is a flow chart of steps for performing a method for providing surface elements that provide electrostatic haptic effects according to one embodiment. In some embodiments, the steps in FIG. 7 may be implemented in program code that is executed by a processor, for example, the processor in a general purpose computer, a mobile device, or a server. In some embodiments, these steps may be implemented by a group of processors. In some embodiments one or more steps shown in FIG. 7 may be omitted or performed in a different order. Similarly, in some embodiments, additional steps not shown in FIG. 7 may also be performed. The steps below are described with reference to components described above with regard to system 100 shown in FIG. 1.

The method 700 begins at step 702 when sensor 130 detects whether a surface is contacting a user. In some embodiments, sensor 130 may comprise an ambient light detector, a pressure sensor, a temperature sensor, and/or other sensor for detecting contact between the surface and a user. In some embodiments, the surface may be flexible.

The method 700 continues at step 704, when sensor 130 transmits a sensor signal associated with the detection to processor 102. In some embodiments, the sensor 130 signal may comprise an analog signal. In other embodiments, the sensor 130 signal may comprise a digital signal.

The method 700 continues at step 706 when processor 102 determines an ESF-based haptic effect. In some embodiments, the ESF-based haptic effect may comprise a simulated texture, a simulated vibration, a change in a perceived coefficient of friction, or a stroking sensation. In some embodiments, processor 102 may determine the ESF-based haptic effect based at least in part on the sensor 130 signal associated with a detected contact between a user and a surface.

In some embodiments, the processor 102 may rely on programming contained in haptic effect determination module 126 to determine the ESF-based haptic effect to output to haptic output device 118. In some embodiments, haptic effect determination module 126 may comprise a lookup table. In some embodiments, processor 102 may use the lookup table to associate events with particular ESF-based haptic effects. In some embodiments, the ESF-based haptic effects may comprise a plurality of textures. For example, the plurality of textures may comprise one or more of the textures of: sand, glass, bumps, rubber, or any other available texture.

In some embodiments, processor 102 may determine an ESF-based haptic effect based in part on a user interaction with the touch sensitive surface 116. In some embodiments, sensor 108 may comprise one or more of a plurality of sensors known in the art, for example, resistive and/or capacitive sensors may be embedded in touch sensitive surface 116 and used to determine the location of a touch and other information, such as pressure. Upon detecting an interaction, sensors 108 may send a signal associated with that interaction to processor 102. The sensor 108 signal may comprise data associated with the speed, pressure, or direction, of the user interaction, which processor 102 may use at least in part to determine a haptic effect. In some embodiments, processor 102 may determine a haptic effect based in part on a user interaction with a real or virtual button, a joystick, and/or tilting or moving computing device 101. For example, in some embodiments, processor 102 may determine a haptic effect based on a user pressing a button comprising a series of simulated vibrations.

In some embodiments, processor 102 may determine the haptic effect based in part on a signal from a sensor 130 configured to detect one or more of motion, orientation, a GPS location, an amount of ambient light, a temperature, or whether a user is in contact with the ESF device. For example, in one embodiment, processor 102 may associate a contact between a user and the ESF device with an ESF-based haptic effect comprising a stroking sensation.

In other embodiments, processor 102 may use activity associated with an electronic game (e.g., a game played on a tablet, computer, or dedicated gaming system such as a console) to determine a haptic effect. For example, in some embodiments, an ESF-based haptic effect may be associated with the virtual terrain that a character in the game is passing over. In one such embodiment, an ESF-based haptic effect may be associated with dangerous terrain, like lava, over which the character in the video game is walking. In such an embodiment, the processor 102 may determine an ESF-based haptic effect configured to cause the haptic output device 118 to output a haptic effect simulating an intense vibration.

In some embodiments, processor 102 may use a system status message, a system notification, and/or other events to determine a haptic effect. For example, a system status message, such as low battery or low memory, or a system notification, such as a notification generated based on the system receiving an incoming call, may be associated with particular ESF-based haptic effects. In one such embodiment, upon the system receiving an incoming call, processor 102 may consult the haptic effect determination module 126 and associate an incoming call notification with an ESF-based haptic effect comprising a simulated vibration.

In one embodiment, the processor 102 may apply data from a user input, a system status message, or a sensor 108 or 130 signal to an algorithm to determine the ESF-based haptic effect. For example, in one such embodiment, a user may input a number as part of a game. In response, the processor 102 may determine an ESF-based haptic effect wherein the haptic output device 118 outputs a stroke that increases or decreases in speed inversely proportionally to a number the user inputs. In another embodiment, processor 102 may determine an ESF-based haptic effect wherein the haptic output device 118 outputs a vibration with intensity that is inversely proportional to the amount of battery life the computing device 101 has left.

Further, in some embodiments, users may have "haptic profiles" wherein a user can determine and save in memory 104 a "profile" of the haptic effects he or she would like associated with particular events. For example, in one embodiment, a user can select from a list of available haptic effects and associate one of these haptic effects with a real or virtual button on a user interface. In one such embodiment, the list may comprise, for example, ESF-based haptic effects such as fast stroke, slow stroke, intense vibration, light vibration, or textures such as bumpy, rubbery, or smooth. In such an embodiment, the processor 102 may consult with the user's haptic profile to determine which ESF-based haptic effect to generate. For example, if the user's haptic profile associates interaction with the button with a fast stroke, in response to the user placing his or her finger over the button, processor 102 may determine an ESF-based haptic effect wherein the user perceives a fast stroke on his or her skin.

The method 700 continues at step 708 when processor 102 transmits a haptic signal associated with the ESF-based haptic effect. Processor 102 may transmit the haptic signal to an ESF controller 120. In some embodiments, the processor 102 may access drive signals stored in memory 104 and associated with particular ESF-based haptic effects. In one embodiment, a signal may be generated by accessing a stored algorithm and inputting parameters associated with an effect. For example, in such an embodiment, an algorithm may output data for use in generating a drive signal based on amplitude and frequency parameters. As another example, a haptic signal may comprise data to be decoded by the actuator. For instance, the actuator may itself respond to commands specifying parameters such as amplitude and frequency.

The method 700 continues at step 710 when the ESF controller 120 receives the haptic signal. In some embodiments, the haptic signal may comprise a digital signal. In other embodiments, the haptic signal may comprise an analog signal. In some such embodiments, the ESF controller 120 may perform analog-to-digital conversion.

The method 700 continues at step 712 when the ESF controller 120 determines an ESF signal. In some embodiments, the ESF controller 120 may determine an ESF signal based at least in part on the haptic signal.

In some embodiments, the ESF controller 120 may comprise a processor or a microcontroller. The processor or microcontroller may rely on programming contained in memory to determine the ESF signal to output to haptic output device 118. In some embodiments, the programming contained in the memory may comprise a lookup table. In some embodiments, the processor or microcontroller may use the lookup table to associate a haptic signal with an ESF signal to output. For example, in some such embodiments, the ESF controller 120 may use a lookup table to associate a haptic signal with an ESF signal comprising an amplified, inverted, or frequency-shifted version of the haptic signal. In other embodiments, the programming contained in the memory may comprise an algorithm. In some such embodiments, the processor or microcontroller may determine the ESF signal by applying data from the haptic signal to the algorithm.

In some embodiments, the ESF controller 120 may comprise a crystal oscillator, a relay, a multiplexer, an amplifier, a switch, and/or other means for generating an ESF signal. In some such embodiments, the ESF controller 120 may comprise a switch coupling the conductor of the haptic output device 118 to a high voltage source. In such an embodiment, the haptic signal may cause ESF controller 120 to oscillate the switch, such that an ESF signal comprising high voltage is transmitted to the conductor in a pattern configured to generate the desired ESF-based haptic effect. In still other embodiments, the ESF controller 120 may comprise a multiplexer coupling one or more conductors in haptic output device 118 to a high voltage source. Based on the haptic signal, the ESF controller 120 may control the multiplexer such that an ESF signal comprising high voltage is transmitted to the conductors in a pattern configured to generate the desired ESF-based haptic effect.

The method 700 continues at step 714 when ESF controller 120 transmits an ESF signal associated with the haptic signal to haptic output device 118. In some embodiments, the ESF controller 120 may output, as the ESF signal, an amplified, frequency-shifted, or inverted version of the haptic signal to the conductor in the haptic output device 118. In some embodiments, the ESF controller 120 may output high voltage as the ESF signal to haptic output device 118. In some embodiments, the ESF controller 120 may access drive signals stored in memory and associated with particular ESF-based haptic effects or haptic signals. In one embodiment, a signal may be generated by accessing a stored algorithm and inputting parameters associated with an effect. For example, in such an embodiment, an algorithm may output data for use in generating a drive signal based on amplitude and frequency parameters. As another example, a ESF signal may comprise data to be decoded by the actuator. For instance, the actuator may itself respond to commands specifying parameters such as amplitude and frequency.

The method 700 continues at step 716 when haptic output device 118 outputs the ESF-based haptic effect. Haptic output device 118 receives the ESF signal and outputs the ESF-based haptic effect. In some embodiments, the ESF-based haptic effect comprises a simulated vibration, a change in a perceived coefficient of friction, or a simulated texture to the user. In some embodiments, haptic output device 118 is flexible and configured to contact a user.

In some embodiments, haptic output device 118 comprises an insulator coupled to a conductor. The ESF signal comprises an electric signal that is applied to the conductor, which charges the conductor. The electric signal is an AC signal that, in some embodiments, may be generated by a high-voltage amplifier. In some embodiments, the charge on the conductor may capacitively couple the conductor with an object near or touching the haptic output device 118, for example, a user's fingers. The capacitive coupling may, in some embodiments, result in the user perceiving the haptic effect.

In some embodiments, haptic output device 118 comprises electrodes coupled to a fixed panel. The haptic output device 118 may further comprise electrodes coupled to a panel configured to move. In some embodiments, the ESF signal may charge the fixed-panel's electrodes with a polarity (e.g., positive) and the moving-panel's electrodes with an opposite polarity (e.g., negative). In some embodiments, the fixed-panel's electrodes will attract the moving-panel's electrodes, causing the moving panel to slide. The sliding of the moving panel may, in some embodiments, result in the user perceiving the haptic effect comprising a stroking sensation.

Advantages of a Surface Element that Provides Electrostatic Haptic Effects

There are numerous advantages to surface elements that provide electrostatic haptic effects. For example, in some embodiments, surface elements that provide electrostatic haptic effects may be easier to implement than traditional ESF-based haptic output devices. Embodiments may be small, thin, and flexible, as opposed to traditional vibrotactile devices that may be rigid and require relatively large areas to implement. Moreover, in some embodiments, surface elements that provide electrostatic haptic effects may comprise fewer components than some alternative haptic output devices, making surface elements that provide electrostatic haptic effects cheaper to implement.

In some embodiments ESF output devices may be positioned on devices previously unable to provide haptic feedback. That is, in some embodiments, the ESF output devices may be positioned on devices that were not originally haptically enabled. For example, embodiments may be positioned on the surfaces of pens, socks, rings, sleeves, gear shifters, or virtually any other wearable or manipulable device to provide haptic feedback. Providing haptic feedback in such embodiments may provide a multitude of benefits, for example by allowing users to interact with devices without having to visually focus on the devices, which may increase overall user satisfaction.

In some embodiments, manufacturers may be able to omit haptic feedback components from their devices, because the devices can be communicatively coupled to surface elements that provide the haptic feedback. For example, manufacturers of mobile phones, tablets, laptop computers, desktop computers, or e-readers may be able to remove haptic feedback components from within the devices, because the devices may be able to interface (e.g., via IEEE 802.11 or Bluetooth) with external surface elements that provide the haptic feedback to users. As a result, manufacturers may be able to produce smaller, lighter, and/or cheaper devices. Further, embodiments of the present disclosure may enable legacy devices that do not include haptic functionality to be programmed to control haptic output devices of the type described herein.

Some embodiments may also provide an improved haptic experience. In some embodiments, providing haptic feedback via surface elements positioned on wearable devices may allow a user to feel various haptic effects, simultaneously or separately, on various parts of his or her body. This may produce a more immersive haptic experience. For example, in one such embodiment, a user may be wearing a hat, a shirt, pants, and socks each containing surface elements that can provide haptic feedback. In response to the user's virtual character getting shot in a video game, the system may output a haptic effect (e.g., a simulated vibration) from the haptic output device positioned on the user's body closest to where his virtual character was shot. Thus, the user may perceive a more realistic haptic experience than if the user's gaming controller simply vibrated, as is traditionally the case, regardless of where on the user's virtual character was shot. Further, in embodiments comprising surface elements and additional haptic output devices (e.g., ERMs or LRAs), the range of haptic effects that can be delivered to a user may increase. The increased range of available haptic effects may produce a more realistic or immersive haptic experience for a user.

In some embodiments, surface elements that provide haptic effects may allow a device to provide notifications to a user, even when the user is not in physical contact with his or her device. For example, in one embodiment, a surface element positioned on a user's hat may output a haptic effect (e.g., a simulated vibration) when there is an incoming call, thus alerting the user to the incoming call even if the user is out of hearing distance of the phone's ringer.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A system comprising:
a processor;
a memory device that includes instructions executable by the processor to cause the processor to:
determine a game event; and
transmit a haptic signal based on the game event; and
a haptic output device communicatively coupled to the processor, the haptic output device including:
a first panel positioned in a first plane and having a first set of electrodes; and
a second panel positioned in a second plane and having a second set of electrodes, the second plane being different from the first plane;
wherein the haptic output device is configured to output, based on the haptic signal, a haptic effect by generating an electrostatic coupling between the first set of electrodes and the second set of electrodes, the electrostatic coupling being configured to cause the first panel to slide laterally with respect to the second panel.

2. The system of claim 1, wherein the haptic output device is positioned on a game controller.

3. The system of claim 2, wherein the processor and memory device are positioned in a game system that is remote from the game controller.

4. The system of claim 2, wherein the haptic output device is positioned on a joystick, a trigger, or a button of the game controller.

5. The system of claim 1, wherein the haptic effect is configured to simulate movement or fluid flow in a video game.

6. The system of claim 1, wherein the haptic output device further comprises a housing formed from an insulator material, and wherein an electrode in the first set of electrodes or the second set of electrodes comprises a deposited carbon nanotube.

7. Wherein the first panel is substantially parallel to the second panel.

8. The system of claim 1, further comprising a sensor configured to detect a contact between a surface of the haptic output device and an object and transmit a sensor signal associated with the contact.

9. The system of claim 8, wherein the memory device further includes instructions executable by the processor to cause the processor to:
receive the sensor signal from the sensor; and
generate the haptic signal based at least in part on the contact.

10. The system of claim 1, wherein the haptic effect comprises: a change in a perceived coefficient of friction, a stroking sensation, a simulated texture, or a simulated vibration.

11. The system of claim 1, wherein the haptic output device is flexible.

12. The system of claim 1, wherein the memory device further includes instructions executable by the processor to cause the processor to:
determine a non-electrostatic force (ESF)-based haptic effect; and
transmit a second haptic signal associated with the non-ESF-based haptic effect to a second haptic output device, the second haptic output device being configured to receive the second haptic signal and output the non-ESF-based haptic effect.

13. A method comprising:
determining, by a processor, a game event;
transmitting, by the processor, a haptic signal to a haptic output device based on the game event, wherein the haptic output device includes:
a first panel positioned in a first plane and having a first set of electrodes; and
a second panel positioned in a second plane and having a second set of electrodes, the second plane being different from the first plane; and
outputting, by the haptic output device, a haptic effect in response to the haptic signal, wherein the haptic output device outputs the haptic effect by generating an electrostatic coupling between the first set of electrodes and the second set of electrodes, the electrostatic coupling causing the first panel to slide laterally with respect to the second panel.

14. The method of claim 13, wherein the haptic output device is positioned on a game controller.

15. The method of claim 14, wherein the haptic output device is positioned on a joystick, a trigger, or a button of the game controller.

16. The method of claim 13, wherein the first panel is substantially parallel to the second panel.

17. A haptic output device comprising:
a first panel positioned in a first plane and having a first set of electrodes; and
a second panel positioned in a second plane and having a second set of electrodes, the second plane being different from the first plane;
wherein the haptic output device is configured to output, based on a haptic signal from a processor, a haptic effect by generating an electrostatic coupling between the first set of electrodes and the second set of electrodes, the electrostatic coupling being configured to cause the first panel to slide laterally with respect to the second panel.

18. The a haptic output device of claim 17, wherein the haptic output device is positioned on a game controller or a wearable device.

19. The haptic output device of claim 18, wherein the haptic output device is positioned on joystick, a trigger, or a button of the game controller.

20. The haptic output device of claim 17, wherein the first panel is substantially parallel to the second panel.

* * * * *